Nov. 25, 1958  M. J. O'TOOLE ET AL  2,861,745
NOMOGRAPHIC CALCULATOR

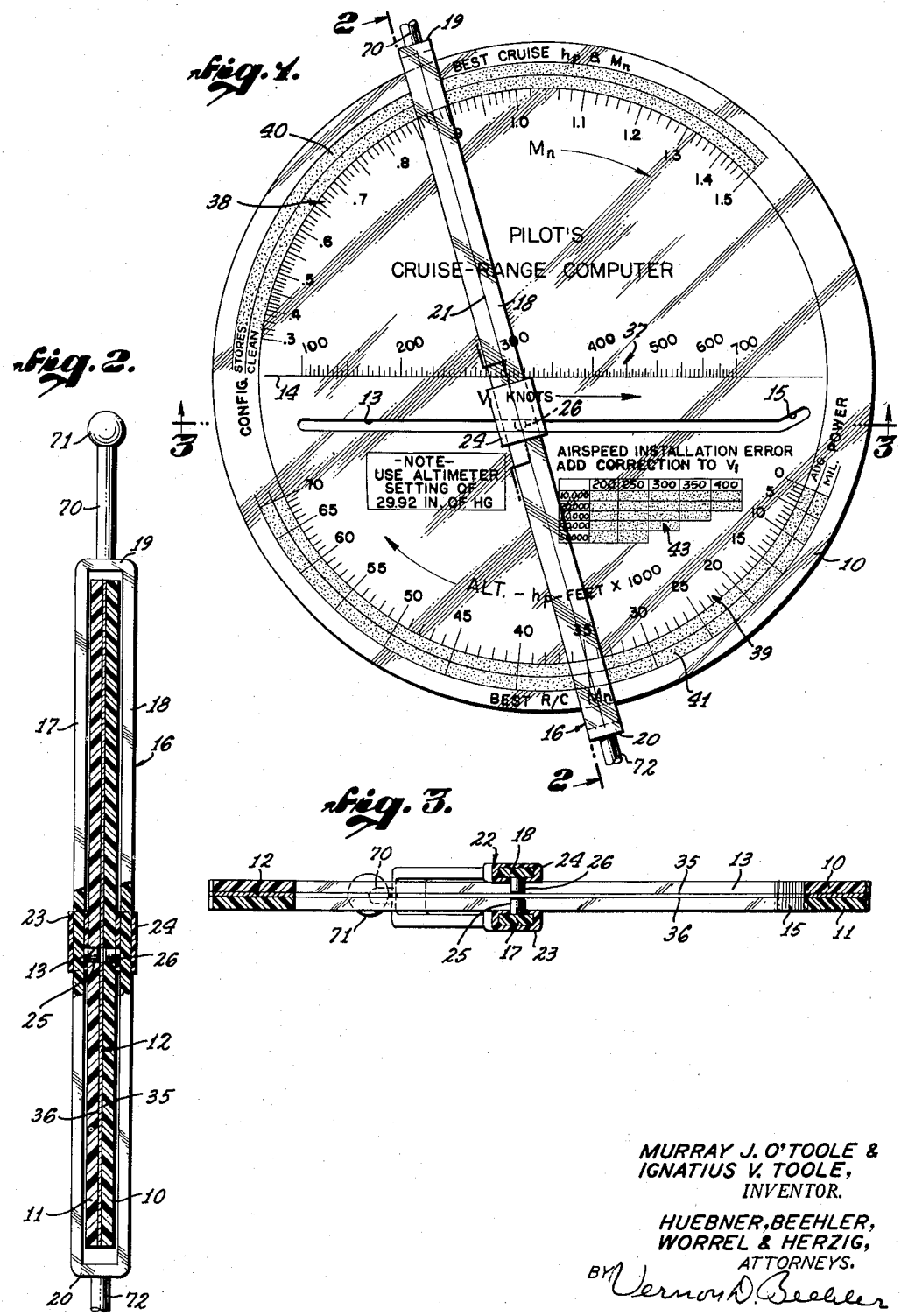

Filed July 19, 1956  4 Sheets-Sheet 2

MURRAY J. O'TOOLE &
IGNATIUS V. TOOLE,
INVENTOR.

HUEBNER, BEEHLER,
WORREL & HERZIG,
ATTORNEYS.

Nov. 25, 1958       M. J. O'TOOLE ET AL       2,861,745
NOMOGRAPHIC CALCULATOR

Filed July 19, 1956       4 Sheets-Sheet 3

MURRAY J. O'TOOLE &
IGNATIUS V. TOOLE,
    INVENTOR.

HUEBNER, BEEHLER,
WORREL & HERZIG,
        ATTORNEYS.

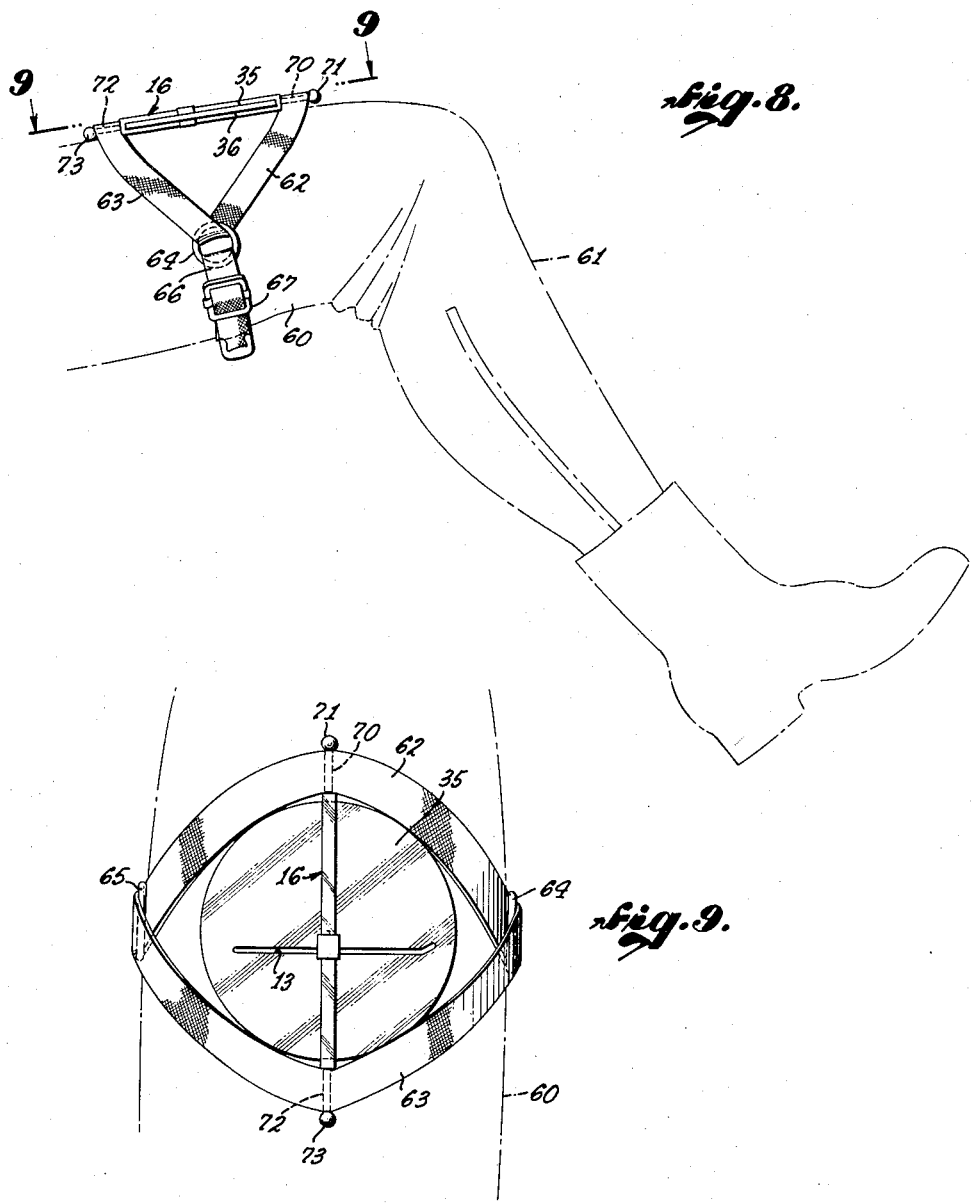

United States Patent Office 2,861,745
Patented Nov. 25, 1958

2,861,745

NOMOGRAPHIC CALCULATOR

Murray J. O'Toole and Ignatius V. Toole, Lancaster, Calif.

Application July 19, 1956, Serial No. 598,879

8 Claims. (Cl. 235—61)

The invention relates to calculators wherein mathematical formulae are reduced to graduations on charts located in an interrelated position so that by application of some type of indexing means to the charts known information applied to certain charts can be employed to elicit desired unknown information from still other charts. More particularly the invention relates to a calculator wherein charted information is compactly arranged on a portable device which in one instance is capable of being attached to the person of the operator as, for example, the leg of the pilot of an airplane and there used to determine certain information useful to the pilot in flight.

With the rapid development of aircraft in recent years previously known and accepted methods of calculating certain information needed for navigation purposes have become too cumbersome to be useful. This applies especially to the navigation of jet powered aircraft which fly at speeds many times faster than aircraft heretofore prevalent. Moreover, an increasing amount of flight and navigation data is requisite and exceeding by far the type of information previously necessary where slower flight times were the rule. Furthermore, because of the extremely high speed at which jet aircraft are driven, a sharply decreased amount of time is available to the pilot to seek out and determine important flight and navigation information. Those calculators heretofore found sufficient by reason of their being accurate to the extent of giving reliable information have been found inadequate for fast flight conditions because the time consumed in their manipulation does not permit the pilot to acquire the needed information quickly enough for it to be useful.

It is therefore among the objects of the invention to provide a new and improved calculator of a portable type which enables information to be gained thereby extremely quickly and with a degree of accuracy which can be depended upon.

Another object of the invention is to provide a new and improved portable calculator which is compact in size, light-weight, and which in spite of these attributes remains an accurate, dependable and easily manipulatable instrument.

Still another object of the invention is to provide a new and improved portable light-weight chart calculator which can be attached to the operator's person by convenient means permitting manipulation with one hand and which further is so constructed that both sides of the calculator may be employed for securing various different types of information as occasion may demand.

A still further object of the invention is to provide a new and improved portable and easily manipulatable chart calculator which is simple to the point of avoiding necessity of providing appurtenances in the nature of handles, thereby minimizing the size and weight of the calculator, and which depends upon the calculator being so built that the body of the instrument itself provides a necessary and sure hand hold for the operator in making quick and accurate calculations under adverse conditions.

Still further among the objects of the invention is to provide an accurate, light-weight, inexpensive portable calculator dependably accurate and which is so constructed with respect to the selection and arrangement of tabulated information that additional information peculiar to specialized types of aircraft can be added at will to the calculator in a position permitting ready incorporation into necessary calculations which involve the standard information pertinent to all types of craft.

With these and other objects in view, the invention consists in the construction, arrangement and combination of the various parts of the device whereby the objects contemplated are attained, as hereinafter set forth, pointed out in the appended claims and illustrated in the accompanying drawings.

In the drawings:

Figure 1 is a front elevational view of the calculator.

Figure 2 is a cross-sectional view taken on the line 2—2 of Figure 1.

Figure 3 is a cross-sectional view taken on the line 3—3 of Figure 1.

Figure 8 is a view of a leg harness in place whereby the computor may be conveniently secured to a pilot's leg for immediate use.

Figure 9 is a plan view taken on the line 9—9 of Figure 8.

Figure 4:
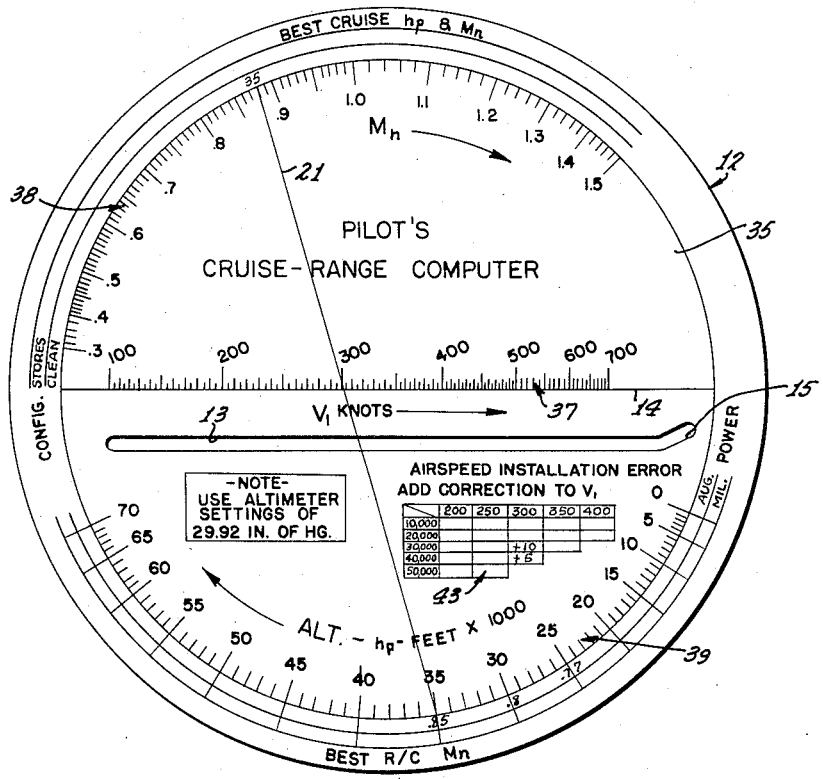
Figure 4 is a front elevational view of the calculator with the hair line carrier removed and showing in diagram the position of a hair line for an example of calculating required of the device.
Figure 5:
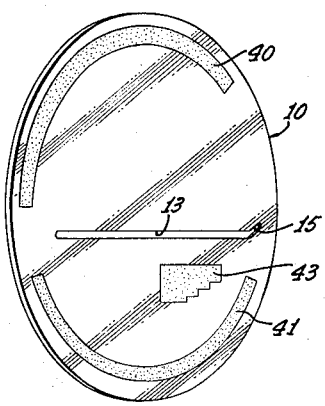
Figure 5 is a perspective view of the front face of the calculator in which the legends and hair line carrier have been omitted for the purpose of illustrating other pertinent parts.

In an embodiment of the invention chosen for the purpose of illustration the calculator is shown as comprising a front plate or disc 10 and a rear plate or disc 11 of transparent preferably light-weight plastic material positioned parallel to each other and confining between them a sheet 12 of chart material. The discs may be secured to each other at the edges or periphery or if preferred may each in turn be fastened by some suitable transparent adhesive to the sheet of chart material.

Extending in a generally transverse direction is a slot 13 parallel to and spaced from a diametrical line 14, the slot 13 having an end portion 15 extending in a generally oblique direction toward the diametrical line 14.

A hair line carrier indicated generally by the reference character 16 comprises a pair of parallel arms 17 and 18 of preferably transparent material secured to each other by end elements 19 and 20. On the arm 17 is a hair line 21 extending longitudinally and separately from end to end. A similar hair line is present on the arm 18. It will be noted particularly with reference to Figure 2 that the arms have a length not more than slightly exceeding the diameter of the discs so that only a meager clearance is present between the end elements 19 and 20 and the edge of the disc when the hair line carrier is in a true diametrical position.

To facilitate manipulation of a hair line carrier as short as that shown into all positions of adjustment over the discs, the arms are slidably mounted upon a holder indicated generally by the reference character 22. More particularly the holder consists of a slideway 23, preferably of transparent material, within which the arm 17 can slide freely. A slideway 24 in a similar fashion provides a transparent sliding mounting for the arm 18. A shoe 25 is in actuality part of the slideway 23 and is so positioned that it is slideably received in the slot 13 and its end portion 15, extending only approximately to the depth of the disc 10. A similar shoe 26 comprises part of the slideway 24 and extends into the slot 13 from the opposite side and in axial alignment with the shoe 25. Thus mounted if the hair line carrier for proper manipulation with respect to the chart needs to be positioned so that the holder is near the left end of the slot, for example, as viewed in Figure 1, and the arms tilted in a sharply oblique direction, the arms can be slid within the slideways permitting the arms to move freely into any position of adjustment without binding and moreover without the necessity of having the length of the arms any greater than what amounts to the diameter of the discs plus a slight working clearance. Constructed in this fashion the calculator can be kept compact without the necessity of resorting to a bulky arrangement of the chart material.

Constructing the hair line carrier in this fashion and in this relationship to the discs which carry the sheet of chart material, the hair line carrier itself may be employed as a means of securing the instrument to the person of the operator as, for example, securing it to the right leg of a pilot. To facilitate securing the calculator in this fashion there is provided for convenience a leg harness shown to advantage in Figures 8 and 9 in position on an upper portion 60 of a pilot's leg 61. The harness comprises straps 62 and 63 which lie over the upper portion of the leg when worn. The straps are joined at junctions 64 and 65 to a single web or strap element 66. This strap element is in two parts which may be connected by means of a buckle 67.

When the instrument is to be mounted by means of a harness the hair line carrier or curser 16 may be provided with a forward extension 70 terminating in a knob 71 and a rearward extension 72 terminating in a knob 73. To facilitate manipulation, subsequently to be described, the harness is preferably of elastic material in that either straps 62 and 63 may be elastic or the strap or straps 66, or on some occasions all straps, may be slightly elastic. Although a harness is suggested and shown, the knobs may be secured by appropriate comparable means to some portion of the airplane rather than to the pilot.

On the sheet 12 of chart material is a front face 35 and a rear face 36. In the chosen example on the front face is a straight line diametrically positioned scale 37 graduated quantitatively in accordance with accepted formulae to indicate relative air speed in knots per hour covering speeds of 100 to 700 knots.

On the upper half of the front face above the straight line diametrical scale is a curved circumferential scale 38. This scale is graduated proportionately and in conformance with accepted formulae to indicate Mach numbers from .3 to 1.5 on the chosen example. On the lower half of the front face 35 a second curved circumferential scale 39 is employed wherein a graduated scale indicates altitude in thousands of feet covering intervals from one thousand to seventy thousand. To further facilitate the accumulation of cruise information there is provided opposite the scale 38 a frosted arc 40 wherein prior to flight the operator or pilot can write in with wax pencil or other appropriate means information peculiar to the type of airplane being flown, as for example, the best cruising speed for the airplane when flying loaded or with stores, for example, and when flying empty or clean, for example. Similarly there is provided a frosted arcuate portion 41 upon which other necessary information peculiar to some particular airplane can be written in with suitable pencil as, for example, the Mach number giving the best rate of climb or R/C for conditions where either augmented power is present or when military power is present in the example chosen for the purpose of illustration.

Due to the fact that air speed indicators are located with such respect to the air frame that under certain conditions there is a slight error in the true air speed indication, means is provided for marking down the correction to the air speed indicator in the form of a frosted area 43 where for different altitudes and corresponding speeds the positive or negative correction can be entered. Information of the type needing to be entered for some specific airplane is available to the pilot or operator from certain hand books and charts, the information of which is determined by the designer of that particular airplane.

On the rear face 36 different information may be provided in calibrated scales to enable the pilot or operator to determine by appropriate quick calculation needed operating information under particular circumstances. On this face 36 a straight line diametrical scale 45 is graduated to indicate Mach numbers from .3 to 1.5 on the top side of a diametrical line 46. On the lower side of the same line 46 is a scale graduated in suitable intervals to indicate time in hours and fractions thereof from ten minutes to four hours.

Cooperative with the scale 45 are two arcuate circumferential scales, namely, a scale 48 graduated to show indicated outside air temperature in degrees centigrade. Air temperature information is available to the pilot by appropriate gages in the cockpit. A second arcuate scale on the lower half of the face 36, namely, a scale 49, is graduated to indicate velocity, that is to say, true velocity in knots from 100 to 1000.

Cooperative with the time scale 47 are two other arcuate or circumferential scales, namely, a scale 50 graduated to show fuel quantity in pounds carried by the airplane and a scale 51 graduated to show fuel flow in pounds per hour.

Still another arcuate circumferential scale 52 is employed on the upper half of the face 36 graduated to show range in nautical miles from 100 to 2000.

Inasmuch as the direction and speed of prevailing wind has a direct and important influence on range and true speed with relation to ground, provision is made in the form of a frosted area 53 wherein before leaving the ground or as a result of radio communication the pilot or operator is enable to write in the heading or angle with respect to the wind of the course of the airplane and the resulting wind vector or figure which represents the positive or negative effect of that particular wind condition upon the true ground speed of the airplane.

For convenience the side having the scale 35 is termed the information side and the opposite side the working side. In common parlance the hair line carried is frequently referred to as the curser.

In the operation of the device the information ordinarily written into the frosted areas is acquired by the pilot or navigator on the ground before entering the cockpit. This important and necessary information is written upon one side or another of the calculator. It will remain important in the calculations until either the pilot changes to another airplane or until certain specified conditions with respect to wind and direction might change. The calculator is then fastened ordinarily to the right upper leg of the pilot for convenience when the pilot is seated in the cockpit. The hair line carrier is the portion fastened to the pilot's leg and the disc portion of the calculator remains free to be grasped by the right hand and manipulated with respect to the hair line carrier.

To appreciate the derivation of graduations on the front face 35 or information side, for example, which have already been specifically referred to, these formulae are noted:

For subsonic calculations:

$M_n < 1.0$ $$Q_c = 0.001189 V_{ic}^2 = P_o\left[\left(1 + \frac{M_n^2}{5}\right)^{3.5} - 1\right]$$

For supersonic calculations:

$M_n 1.0$ $$Q_c = 0.001189 V_i^2 = P_o\left[\frac{7M^2-1}{6}\left(\frac{36M^2}{5(7M^2-1)}\right)^{3.5} - 1\right]$$

Where $P_o$ = static altitude pressure (P. S. F.)
$V_i$ = feet/sec.

The setting of Figure 4 is a typical setting for an airplane flying with augmented power wherein the quantities have been written in at the appropriate portion of the frosted arcuate space 41 as being .85, .8, .77, etc. For that same airplane flying "clean" the best cruising altitude is indicated as 35 at the appropriate location on the frosted arcuate portion 40. Under those circumstances the hair line carrier is moved to a position wherein the hair line 21 or curser intersects the pressure altitude scale ($h_p$) at 35, obtained from the pilot's instrument panel and the indicated air speed ($V_{i_o}$) of 300 obtained from the pilot's air speed indicator will provide the pilot with his indicated flight Mach number of .88.

It is called to the user's attention that when using the computer for determination of Mach number that pressure altitude must be used. This means that the altimeter setting knob must be adjusted so that the altimeter setting is 29.92" of mercury. Neglect of this causes enormous errors.

In using the reverse side or rear face 36 different types of information can be secured. The basis of the quantities appearing on the scales on the rear face 36 is contained in certain formulae as follows:

The formula of relationship between total temperature ($T_t$), Mach number $M_n$ and true air speed $V_t$ solved by the computer is $$V_t^2{}_{(knots)}\left(\frac{1}{M_n^2}+\frac{K}{5}\right) = 1516.6(T_{t_{(oc.)}} + 273)$$

Where $K$ = recovery factor of temperature bulb
$K = 1.0$ for this computer
$R_{(air)} = V_t \times$ Time i. e.

Range = true velocity × time

Also solved is the equation for fuel quantity.

Fuel quantity = fuel flow × time or $Q = FF \times$ time

In chosen examples illustrative of use to which the scales on the rear face 36 may be put examples are indicated by positions of the hair line. For example, it may be assumed that the airplane is flying at an altitude of somewhere in the neighborhood of 40,000 feet, at which altitude the air temperature would probably be about zero degrees centigrade. The pilot then by shifting the discs about so that the diametrical $M_n$ scale falls under a hair line 54 at .89 the hair line will cross the speed scale at 530 which will indicate the airplane to be flying at a true air speed of 530 knots. It will be understood, of course, in this connection that the Mach number is the speed in relation to the speed of sound and since the speed of sound varies with the temperature of the air, the speed of the airplane with relation to ground may vary although the Mach number may remain the same.

Figure 6:
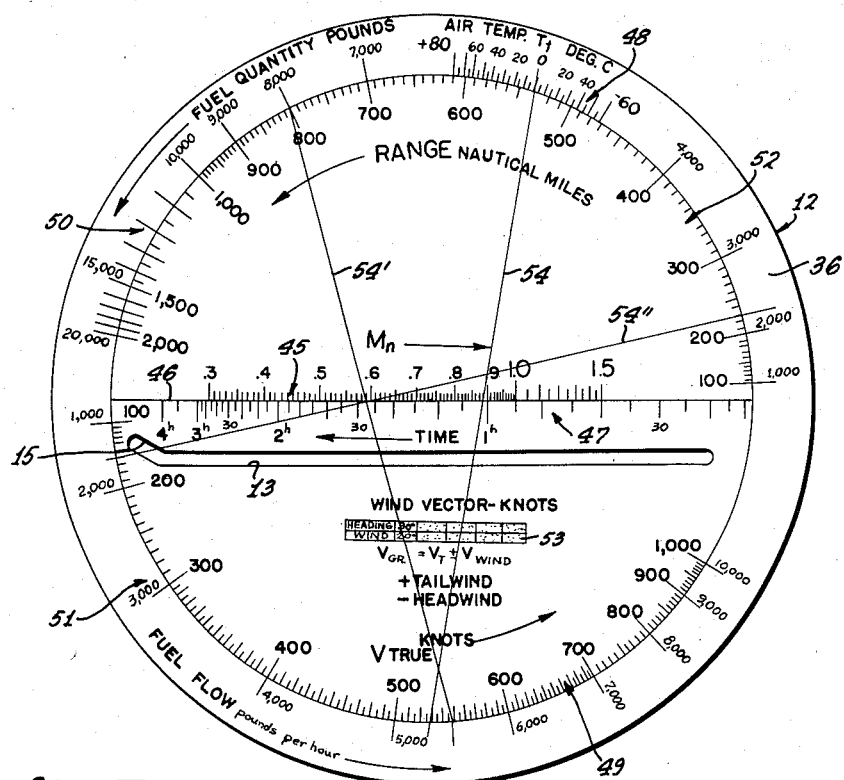
Figure 6 is an elevational view of the rear face of the calculator with the hair line carrier removed showing the hair line diagrammatically in several different positions of manipulation productive of different types of information.
Figure 7:
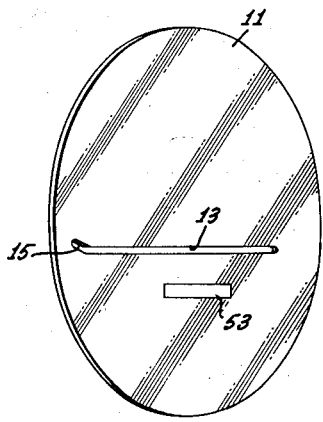
Figure 7 is a rear elevational view of the calculator with the legends and hair line carrier removed.

A second calculation may then be worked out to determine range under the conditions specified in the example illustrated in Figure 6. For example, the velocity which influences range is a combination of air speed and wind direction. If in the example shown the airplane be heading 30 degrees with the wind, at the specific wind velocity of the chosen example, there is a tail wind, the result of which is a correction of plus 20 knots. The hair line in the position 54' is shifted so that its lower end passes through the corrected true velocity, namely, 530 plus 20 equals 550 knots true ground velocity. In this instance the time scale 47 is made use of and if it be assumed that the airplane will be flying one hour and twenty-seven minutes, the hair line position 54' will extend through the one hour twenty seven minute calibration of scale 47 and will indicate on the scale 52 that the range of that airplane at that speed is 800 nautical miles.

Still another simple straight line calculation can be made to determine whether or not the quantity of fuel in the tank at the fuel flow indicated on the gage is sufficient for the specified time interval. To make this calculation the rear face 36 is shifted about with respect to the hair line carrier until the hair line is in the position 54''. That is a position where the hair line crosses the previously indicated time interval of one hour twenty-seven minutes and if the fuel flow in accordance with gage measurement at that time is 1,500 pounds per hour, the pilot can very readily determine that he must have not less than 2,300 pounds of fuel if the amount is to be adequate for the range of 800 miles previously determined. Obviously the fuel gage should show a quantity of fuel slightly in excess of the bare requirement to make sufficient allowance for unforeseeable circumstances.

To further illustrate use of the computer let the hypothetical flight data be as follows:

(1) Airplane in clean level flight configuration—assume readings.
(2) Cruise altitude—40,000 feet.
(3) Best cruise Mach number—0.88.
(4) Indicated outside air temperature—10° C.
(5) Fuel flow = 1800 pounds per hour.
(6) Range = 560 nautical miles. Wind vector along course = 20 knots (headwind).
(7) Handbook information at 40,000 feet = 0.88 $M_n$.
(8) Air speed installation air 250 knots, 40,000 feet = 5 knots.
(9) Fuel quantity = 3000 pounds.

Find:

(1) Cruise indicated air speed.
(2) Time of flight.
(3) Reserve fuel.

Determination of cruise indicated air speed:

(1) (On the "information side" of disc) place the hair line on the Mach number scale at 0.88. Best cruise Mach number (handbook information). Align hair line on altitude scale at 40,000 feet (desired cruise altitude). Read indicated air speed under hair line on diametric scale at 270 knots.
(2) Add air speed installation air 5 knots.
(3) 270 knots plus 5 knots = 275 knots ($V_i$) instrument dial indication for best cruise flight.

Determination of time of flight:

(1) Turn disc over to "working side."
(2) Align hair line on the temperature scale at 10° indicated temperature ($T_t$) and 0.88 Mach number on the diametric scale.
(3) Read on the lower circular scale $V_{true}$ = 540 knots.

(4) Add wind component: $V_{true}$ (−20 knots)=headwind=520 knots $V_{true}$ ground.

(5) Align hair line at lower $V_{true}$ scale to 520 knots ground speed and 560 range nautical miles on upper circular scale. Read time of flight on diametric scale on the bottom side under hair line as one hour and five minutes ($1^h05^m$).

Determination of reserve fuel:

(1) On "working side" of disc align hair line on just determined time of flight on the diametric scale 1'5" and instrument panel fuel flow of 1800 pounds per hour (lower outside scale) and read fuel required on upper circular red scale at 1950 pounds.

(2) Fuel quantity indicator shows 3000 pounds minus 1950 pounds fuel required=1050 pounds fuel reserve.

Of great convenience is the arrangement of applicant's device in combination with the leg harness shown and described in connection with Figures 8 and 9. Mounted in this fashion, for example, the front face or information side 35 may be assumed to lie face uppermost. The calculator may then readily be manipulated by grasping the disc portion while the hair line carrier remains stationary and manipulating the disc portion to the proper orientation with respect to the hair line, thereby to make the necessary calculations. Following this, when it be desired to make use of the face 36 described as the working side, the pilot has only to lift the disc against the light elastic resistance of the harness sufficient so that the disc can be flipped information side down and working side up without disengaging the curser from the harness. Thereafter again by manipulating the disc portion with respect to the hair line carrier or curser, the calculator can be manipulated to give the calculations for which the side 36 is calibrated and arranged. The ability to so manipulate the invention quickly and effectively without disturbing it from a most advantageous position on top of the pilot's leg is a factor which gives the calculator in the form described a very marked advantage in actual operation in the field.

It will be clear from the foregoing description that by reason of arranging the scales in arcuate form in conjunction with a diametrically disposed straight scale and by reason of providing a hair line carrier slidably disposed with respect to its holder and fastened to the person of the operator, a compact calculating instrument is made possible, easily manipulated with one hand and sufficiently accurate to enable the pilot to safely calculate to secure necessary information in a minimum time interval to permit giving the airplane the attention it needs under those circumstances for proper manipulation.

While we have herein shown and described our invention in what we have conceived to be the most practical and preferred embodiment, it is recognized that departures may be made therefrom within the scope of our invention, which is not to be limited to the details disclosed herein but is to be accorded the full scope of the claims so as to embrace any and all equivalent devices.

Having described our invention, what we claim as new and desire to secure by Letters Patent is:

1. In a calculating device, a body assembly comprising a circular disc carrying on at least one side a set of circumferential and diametrical scales quantitatively divided to present mathematical values, said disc having a slot therethrough within the perimeter parallel to and spaced from a diametrical line, a hair line carrier having a hair line thereon adapted to extend across scales for indicating desired information, said carrier comprising a slide shoe located within and slidable in said slot and a slideway adjacent the face of said disc, a slide assembly of transparent material having a length comparable to the diameter of the disc and extending over said scales, said carrier being slidably secured in said slideway and a hair line extending substantially from end to end of said carrier.

2. In a calculating device, a circular body carrying on both sides thereof circumferential and diametrical scales quantitatively divided to present mathematical values, said body having a slot therethrough within the perimeter parallel to and spaced from a diametrical line, a hair line carrier having hair lines thereon adapted to extend across scales on both sides for indicating desired information, said carrier comprising a holder and slide shoe on the holder located within and slidable in said slot, and slideways on the holder adjacent outside faces of said body, a slide assembly of transparent material including two parallel arms slightly greater in length than the diameter of the body lying on opposite sides of the body, said arms being joined at the ends, one of said arms being slidably secured in one of said slideways and the other of said arms being slidably secured in the other of said slideways.

3. In a calculating device, a body assembly comprising a pair of transparent circular discs secured one to the other, a sheet of opaque material therebetween carrying on both sides thereof circumferential and diametrical scales quantitatively divided to present mathematical values, said discs having a slot therethrough within the perimeter parallel to and spaced from a diametrical line, a hair line carrier having hair lines thereon adapted to extend across scales on both sides of the body for indicating desired information, said carrier comprising a holder and a slide shoe on the holder located within and slidable in said slot, said holder comprising slideways of transparent material adjacent outside faces of both said discs, a slide assembly of transparent material including two parallel arms slightly greater in length than the diameter of the discs lying on opposite sides of the body assembly, said arms being joined at the ends, one of said arms being slidably secured in one of said slideways and the other of said arms being slidably secured in the other of said slideways, and a hair line extending substantially from end to end of each arm.

4. In a calculating device, a body assembly comprising a circular body carrying on at least one side circumferential and diametrical scales quantitatively divided to present mathematical values, said circumferential scales having end portions respectively adjacent each other, said body having a slot therethrough within the perimeter parallel to and spaced from a diametrical line, said slot having one end extending obliquely toward the diametrical line, a hair line carrier having a hair line thereon adapted to extend across scales on both sides for indicating desired information, said carrier comprising a slide shoe located within and slidable in said slot and a slideway adjacent the faces of said scales, a slide assembly of transparent material comparable in length to the distance between said circumferential scales and extendible over all said scales, said carrier being movable into said one end of the slot and there pivoted to enable the carrier to reach both end portions of both the circumferential scales close to the diametrical scale.

5. A calculating device for best cruising and rate of climb performance of aircraft comprising a circular disc bearing mathematical information in the form of graduated arcuate scales on opposite sides of a transverse line respectively made up of speed information and altitude information and a graduated scale of similar correlated air speed information on said transverse line, an arcuate marking area adjacent said arcuate scales adapted to the temporary marking thereon of related information concerning aircraft configuration and type of power pertinent to a specific aircraft, a hair line carrier having a hair line extending lengthwise thereof, a holder slidably receiving said carrier, and a slot parallel to and spaced from said transverse line adapted to slidably receive said holder whereby said hair line is adapted to cross said transverse scale between substantially any two points on the respective arcuate scales in a position correlating the information on the respective three scales.

6. A calculating device for best cruising and rate of climb performance of aircraft comprising a transparent circular disc, a sheet bearing mathematical information in the form of graduated circumferential scales on opposite sides of a diametrical line respectively made up of speed ratios relative to the speed of sound and altitude quantities and a graduated scale of similar correlated air speed information on said diametrical line, a roughened circumferential area adjacent said circumferential scales adapted to the temporary marking thereon of related information concerning aircraft configuration and type of power pertinent to a specific aircraft, a hair line carrier having a hair line extending lengthwise thereof, said carrier having a length exceeding the diameter sufficient to overlie the edge of the disc and said roughened circumferential area at both ends, a holder slidably receiving said carrier, and a slot parallel to and spaced from said diametrical line adapted to slidably receive said holder whereby said hair line is adapted to reach across said diametrical scale and between substantially any two points on the respective circumferential scales in a position correlating the information on the respective three scales in all positions of the holder.

7. A calculating device for correlating information on different scales comprising a disc having a straight graduated scale extending transversely, a graduated scale extending arcuately on one side of said straight scale, a graduated scale extending arcuately on the opposite side of said straight scale, a hair line carrier having a length substantially equal to the distance across the disc and a longitudinal hair line thereon, a holder having a portion slidably receiving said carrier, a slot parallel to and spaced on one side of said straight scale, and a shoe on said holder slidably mounted in said slot adapted to carry said carrier from end to end thereof whereby to correlate information on said arcuate scales with said straight scale, and attachment means on said carrier and a leg harness movably secured to said attachment means whereby said carrier is adapted to be secured to the person of an operator of the calculator leaving said disc free for manipulation relative to the carrier.

8. A circular calculating device for correlating information on different scales comprising a disc having a straight graduated scale extending diametrically, a graduated curve scale extending circumferentially on one side of said straight scale, a graduated surved scale extending circumferentially on the opposite side of said straight scale, a transparent hair line carrier having a length substantially equal to the diameter of the disc and a longitudinal hair line thereon, a holder having a transparent portion slidably receiving said carrier, a slot parallel to and spaced on one side of said straight scale, said slot having an end thereof extending obliquely upwardly toward the straight scale and a shoe on said holder slidably mounted in said slot adapted to carry said carrier from end to end thereof whereby to correlate information on substantially the extreme ends of said curved scales with said straight scale, and attachment means extending endwardly of each end of said carrier and a flexible leg harness releasably secured to each attachment means whereby said carrier is adapted to be releasably secured to the person of an operator of the calculator and leaving the disc free for manipulation relative to the carrier.

References Cited in the file of this patent

UNITED STATES PATENTS

| 1,667,812 | Miller | May 1, 1928 |
| 2,007,986 | Sprague | July 16, 1935 |
| 2,420,673 | Monrad | May 20, 1947 |
| 2,676,919 | Huber | Oct. 23, 1956 |

FOREIGN PATENTS

| 361,708 | Germany | Oct. 18, 1922 |